United States Patent
Boudoux et al.

(10) Patent No.: US 12,182,058 B2
(45) Date of Patent: Dec. 31, 2024

(54) COMMUNICATIONS SYSTEM AND METHOD OF OPERATING THE SAME

(71) Applicant: Aptiv Technologies AG, Schaffhausen (CH)

(72) Inventors: Emmanuel Boudoux, Dublin (IE); Frank Trommer, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 521 days.

(21) Appl. No.: 17/648,417

(22) Filed: Jan. 19, 2022

(65) Prior Publication Data

US 2022/0239579 A1 Jul. 28, 2022

(30) Foreign Application Priority Data

Jan. 22, 2021 (EP) .................................. 21153009

(51) Int. Cl.
*G06F 13/42* (2006.01)
(52) U.S. Cl.
CPC ................ *G06F 13/4291* (2013.01)
(58) Field of Classification Search
CPC .................................................. G06F 13/4291
See application file for complete search history.

(56) References Cited

U.S. PATENT DOCUMENTS

| | | | |
|---|---|---|---|
| 8,364,873 B2 | 1/2013 | Chen | |
| 10,055,376 B1 | 8/2018 | Newkirk | |
| 2007/0143512 A1 | 6/2007 | Kuo | |
| 2008/0183928 A1 | 7/2008 | Devila et al. | |
| 2009/0022255 A1 | 1/2009 | Kanekawa et al. | |
| 2009/0125657 A1 | 5/2009 | Hsieh | |
| 2011/0060856 A1 | 3/2011 | Huang et al. | |
| 2011/0078350 A1 | 3/2011 | Carls | |
| 2012/0131247 A1 | 5/2012 | Mok | |
| 2016/0259745 A1 | 9/2016 | Asaka et al. | |

(Continued)

FOREIGN PATENT DOCUMENTS

| CN | 102929820 A | 2/2013 |
|---|---|---|
| DE | 102014209625 | 1/2016 |

(Continued)

OTHER PUBLICATIONS

"Extended European Search Report", EP Application No. 21153009. 2, Jul. 8, 2021, 5 pages.

*Primary Examiner* — Henry Tsai
*Assistant Examiner* — John B Roche
(74) *Attorney, Agent, or Firm* — Harness, Dickey & Pierce, P.L.C.

(57) ABSTRACT

Communications system including a master circuit having a master serial peripheral interface, SPI, device with an input MISO terminal. A plurality of slave circuits is provided for communication with the master circuit. Each slave includes a slave SPI device, an activation terminal, and an output switch for connecting an output MISO terminal to the input MISO terminal. The master circuit also includes a polling signal terminal for transmitting a polling signal to at least a first group of slave SPI devices for activating them. The master circuit 3 also has a plurality of output CS terminals, each being independently activatable to activate both the respective slave SPI device and the associated output switch.

20 Claims, 7 Drawing Sheets

(56) References Cited

U.S. PATENT DOCUMENTS

| | | | | |
|---|---|---|---|---|
| 2019/0012291 A1* | 1/2019 | Biniguer | ............ | G06F 13/4295 |
| 2019/0107986 A1* | 4/2019 | Ohara | .................... | B60R 16/02 |
| 2019/0286599 A1 | 9/2019 | Lin | | |

FOREIGN PATENT DOCUMENTS

| | | |
|---|---|---|
| EP | 1688846 B1 | 7/2011 |
| EP | 3300289 A1 | 3/2018 |
| WO | 2013184294 A1 | 12/2013 |

\* cited by examiner

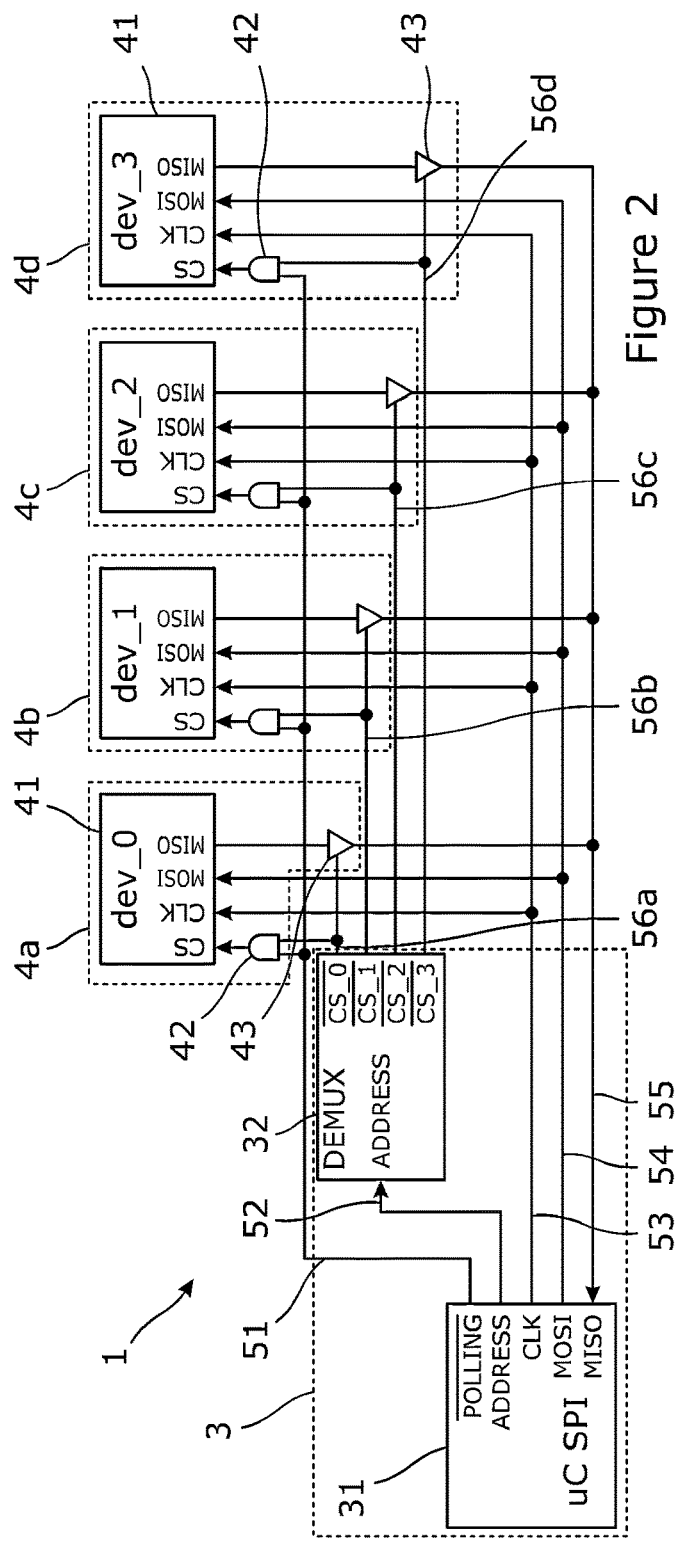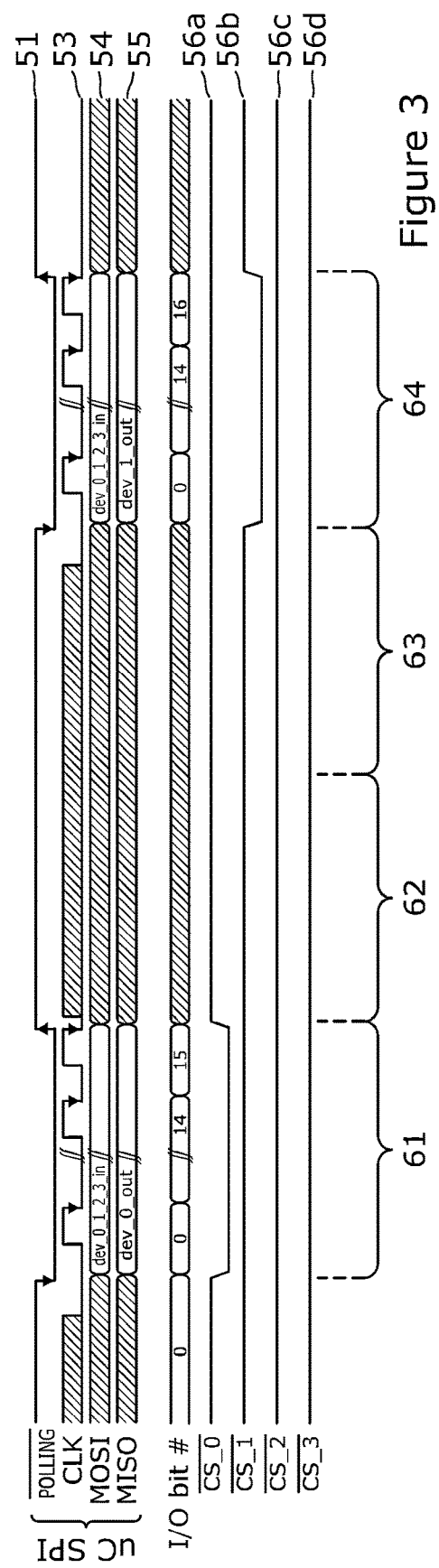

| | | | | | Hardware Fixed Group Selection | | | | | | | | | | |
|---|---|---|---|---|---|---|---|---|---|---|---|---|---|---|---|
| Groups selecting signals, can be multiplexed | | | | | MOSI | | | | | MISO (Answer remains always individual) | | | | | comments |
| Group 1 | | Group 2 | | Grouped? | Group 1 | | Group 2 | | | Group 1 | | Group 2 | | | |
| CS1\ | CS2\ | CSn+1\ | CSn+m\ | Polling\ | SLAVE 1 | SLAVE 2 | SLAVE n | SLAVE n+1 | SLAVE n+m | SLAVE 1 | SLAVE 2 | SLAVE n | SLAVE n+1 | SLAVE n+m | |
| HIGH | HIGH | HIGH | HIGH | HIGH | INACTIVE | INACTIVE | INACTIVE | INACTIVE | INACTIVE | INACTIVE | INACTIVE | INACTIVE | INACTIVE | INACTIVE | normal SPI |
| LOW | HIGH | HIGH | HIGH | HIGH | ACTIVE | INACTIVE | INACTIVE | INACTIVE | INACTIVE | ACTIVE | INACTIVE | INACTIVE | INACTIVE | INACTIVE | |
| HIGH | LOW | HIGH | HIGH | HIGH | INACTIVE | ACTIVE | INACTIVE | INACTIVE | INACTIVE | INACTIVE | ACTIVE | INACTIVE | INACTIVE | INACTIVE | |
| HIGH | HIGH | LOW | HIGH | HIGH | INACTIVE | INACTIVE | ACTIVE | INACTIVE | INACTIVE | INACTIVE | INACTIVE | ACTIVE | INACTIVE | INACTIVE | |
| HIGH | HIGH | HIGH | LOW | HIGH | INACTIVE | INACTIVE | INACTIVE | ACTIVE | INACTIVE | INACTIVE | INACTIVE | INACTIVE | ACTIVE | INACTIVE | |
| HIGH | HIGH | HIGH | HIGH | HIGH | INACTIVE | INACTIVE | INACTIVE | INACTIVE | ACTIVE | INACTIVE | INACTIVE | INACTIVE | INACTIVE | ACTIVE | |
| HIGH | HIGH | HIGH | HIGH | LOW | INACTIVE | INACTIVE | ACTIVE | ACTIVE | ACTIVE | INACTIVE | INACTIVE | INACTIVE | INACTIVE | INACTIVE | grouped SPI |
| LOW | HIGH | HIGH | HIGH | LOW | ACTIVE | INACTIVE | ACTIVE | ACTIVE | ACTIVE | ACTIVE | INACTIVE | INACTIVE | INACTIVE | INACTIVE | |
| HIGH | LOW | HIGH | HIGH | LOW | ACTIVE | ACTIVE | ACTIVE | ACTIVE | ACTIVE | INACTIVE | ACTIVE | INACTIVE | INACTIVE | INACTIVE | |
| HIGH | HIGH | LOW | HIGH | LOW | ACTIVE | ACTIVE | ACTIVE | ACTIVE | ACTIVE | INACTIVE | INACTIVE | ACTIVE | INACTIVE | INACTIVE | |
| HIGH | HIGH | HIGH | LOW | LOW | INACTIVE | INACTIVE | ACTIVE | ACTIVE | ACTIVE | INACTIVE | INACTIVE | INACTIVE | ACTIVE | INACTIVE | |
| HIGH | HIGH | HIGH | HIGH | LOW | INACTIVE | INACTIVE | ACTIVE | ACTIVE | ACTIVE | INACTIVE | INACTIVE | INACTIVE | INACTIVE | ACTIVE | |

Figure 8

COMMUNICATIONS SYSTEM AND METHOD OF OPERATING THE SAME

CROSS-REFERENCE OF RELATED APPLICATIONS

This application claims priority to European Patent Application Number 21153009.2, filed Jan. 22, 2021, the disclosure of which is hereby incorporated by reference in its entirety herein.

BACKGROUND

The present disclosure relates to a communications system and a method of operating the same. The present disclosure is particularly relevant to a communication apparatus using a serial peripheral interface (SPI) protocol, and most particularly for data transmission circuits in automotive applications. SPI is one of the most common communication protocols used for communications in embedded electronics systems within a vehicle. SPI employs a master-slave architecture in which one master supports communications with one or more slave devices. During operation, the master device initiates a frame to action a read/write operation with a selected slave SPI device, with the slave device being selected using a slave or chip select (CS) signal. This prompts the selected slave device to read data from the master-out slave-in (MOSI) signal line and to write data to the master-in slave-out (MISO) signal line, with the reading and writing of bits being coordinated by a clock signal (CLK).

Within modern vehicles, it is common for a number of devices to require a regular refresh signal to maintain their operation. For example, peripheral devices, such as smart fuses or sensor units, may include a watchdog which needs polling to prevent an unintended time out. Under a standard SPI protocol, it is therefore necessary to have the master device initiate a separate frame to refresh each slave device.

FIG. 1 shows the signals on example prior art SPI bus in which eight slave SPI devices are sequentially polled using active-low chip select signals transmitted on chip select lines cs0 to cs7. As such, the sequence includes eight frames, with each frame prompting a selected slave device, from dev_0 to dev_7, to read a refresh signal from the MOSI line and transmit diagnostic data to the MISO line for logging by the master SPI device.

A problem with the above is that it is relatively slow and requires continuous communication on the SPI bus during the polling sequence. Accordingly, as the number of slave devices increases, more and more processing and SPI bus time is occupied by the refresh operations, reducing the availability of this resource for normal device operation. In addition, it also limits the number of slave devices that may be served by a master device because there may not otherwise be sufficient time between each repeat polling sequence before the watchdog of a particular slave device times-out.

Recently, there has been proposed a number of new SPI based communication systems which seek to address the more general problem of increasing SPI communication speed. For example, it has been proposed to modify the standard SPI protocol to allow different slave devices to communicate within the same frame either by modifying the clock signal or by providing dedicated chip select lines for controlling each slave's MOSI and MISO terminals. However, such arrangements are very complex and require specialised custom hardware, which are significantly more expensive than standard or off-the-shelf SPI integrated circuits. As such, they are not suitable for addressing the above problem associated with refreshing peripheral devices for commercial automotive applications.

There is therefore a need to address the above problems associated with conventional SPI communication systems in a cost effective and simple manner.

SUMMARY

The present disclosure concerns a communications system for allowing the fast polling of one or more groups of multiple slave integrated circuits command procedures. The communication system may be for use within embedded systems in automotive applications.

According to a first aspect, there is provided a communications system, including: a master circuit including a master serial peripheral interface, SPI, device having an input MISO terminal; and a plurality of slave circuits coupled for communication with the master circuit, each includes a slave SPI device, an activation terminal for activating the slave SPI device, and an output switch for connecting an output master-in slave-out, MISO, terminal of the slave SPI device to the input MISO terminal when activated, wherein the master circuit further includes: a polling signal terminal for transmitting a polling signal to the activation terminals of at least a first group of the plurality of slave circuits for activating their respective slave SPI devices; and a plurality of output chip-select, CS, terminals, each independently activatable for transmitting a CS signal to both the activation terminal and the output switch of a respective one of the plurality of slave circuits for activating the respective slave SPI device and connecting its output MISO terminal for transmitting data to the input MISO terminal.

In this way, a plurality of slave SPI devices can be refreshed simultaneously by polling them in a single SPI frame, whilst limiting the data returned to the master SPI device to that transmitted by a single slave SPI device. As such, watchdog timers in all the slave SPI devices can be rapidly reset to avoid timeout based on a common reset signal transmitted on the MOSI line, whilst diagnostic data from one of the slave SPI devices may still be transmitted back to the master on the MISO line. Importantly, this may be achieved without modification to the SPI clock signal or the operating software of the SPI devices.

In embodiments, the master circuit further includes a demultiplexer connected to an address terminal provided on the master SPI device, and wherein the plurality of output CS terminals are provided on the demultiplexer and are individually activatable in response to the demultiplexing of the address signal from the address terminal. In this way, a larger number of slave SPI devices may be controlled using the CS terminals based on a signal output from a single address terminal.

In embodiments, the communications system further includes a second polling signal terminal for transmitting a second polling signal to the activation terminals of a second group of the plurality of slave circuits for simultaneously activating their respective slave SPI devices. In this way, more than one group of slave SPI devices may be polled, thereby allowing different groups to be polled at different intervals as needed. Furthermore, different groups of slave SPI devices which are responsive to different commands on the MOSI line may be instructed separately as a discrete group.

In embodiments, the master circuit further includes a polling logic arrangement, wherein the polling signal terminal and the second polling signal terminal are provided on the polling logic arrangement, wherein the polling logic arrangement includes a plurality of logic gates connected to the master polling terminal provided on the master SPI device and the output CS terminals associated with the first and second groups of slave circuits, and wherein the polling logic arrangement is configured for transmitting a polling signal from one of the first and second polling signal terminals in response to both a master polling signal and at least one CS signal associated with a slave circuit in the respective group. In this way, more than one polling signal group of slave SPI devices may be polled using the output of a single polling terminal on the master SPI device.

In embodiments, the polling signal terminal is further provided on the demultiplexer, and wherein the polling signal terminal is activated based on demultiplexing the address signal from the address terminal. In this way, a basic master SPI device with only an address terminal may be used to generate both CS signals and polling signals through the demultiplexer.

In embodiments, the master SPI device includes a serial clock terminal for transmitting a clock signal to the plurality of slave SPI devices.

In embodiments, the master SPI device includes an output master-out slave-in, MOSI, terminal for transmitting data from the master SPI device to the plurality of slave SPI devices.

In embodiments, the communications system further includes a MOSI line connected between the output MOSI terminal and input MOSI terminals provided on the plurality of slave circuits.

In embodiments, the communications system further includes a MISO line connected between the input MISO terminal and the output MISO terminals of the plurality of slave circuits; a polling signal line connected between the polling signal terminal and the activation terminals of the plurality of slave circuits; and a plurality of CS signal lines, each connected between one of the plurality of output CS terminals and the activation terminal and output switch of one of the slave circuits.

According to a second aspect, there is provided a method for operating a communications system, the method including the steps of: providing a master circuit including a polling signal terminal, a plurality of chip-select, CS, terminals, and a master serial peripheral interface, SPI, device having an input MISO terminal and; providing a plurality of slave circuits coupled for communication with the master circuit, each including a slave SPI device, an activation terminal, and an output switch; transmitting a polling signal from the polling signal terminal to the activation terminals of at least a first group of the plurality of slave circuits for activating their respective slave SPI devices, wherein the respective output MISO terminal is prevented from transmitting data to the input MISO terminal by the output switch unless it is activated; and transmitting CS signals from individual ones of the CS terminals to a respective one of the plurality of slave circuits for activating its activation terminal to activate the respective slave SPI device and for activating the output switch to connect its output MISO terminal to the input MISO terminal for transmitting data thereto.

In embodiments, the method further includes transmitting a sequence of SPI frames, wherein each SPI frame includes transmitting a polling signal and a CS signal from one of the CS terminals to a respective slave circuit, wherein the CS signal is transmitted from a different CS terminal in each frame of the sequence of SPI frames for sequentially connecting the respective output MISO terminals of the slave circuits to the input MISO terminal. In this way, diagnostic data from each of the slave SPI devices may be fed back to the master SPI device over a number of refresh cycles.

In embodiments, wherein the step of providing the master circuit further includes providing a demultiplexer connected to an address terminal provided on the master SPI, wherein the plurality of output CS terminals are provided on the demultiplexer, and wherein the method further includes the steps of: transmitting an address signal from the address terminal to the demultiplexer; demultiplexing the address signal at the demultiplexer; and generating a CS signal from one of the CS terminals for transmission to a respective one of the plurality of slave circuits based on the demultiplexed address signal.

In embodiments, wherein the step of demultiplexing the address signal includes selecting one of the CS terminals to transmit the CS signal based on one of the address signal's least significant bits or the address signal's most significant bits. In this way, a simple multiplexed signal may be used for addressing to a group of slave devices to be refreshed and an individual slave SPI device for returning data to the master.

In embodiments, the step of providing a demultiplexer further includes providing the polling signal terminal on the demultiplexer, and wherein the method further includes generating the polling signal from the polling signal terminal based on the demultiplexed address signal.

In embodiments, the step of demultiplexing the address signal includes selecting to generate a polling signal from the polling signal terminal or a second polling signal from a second polling signal terminal based on one of the address signal's most significant bits or the address signal's least significant bits.

BRIEF DESCRIPTION OF THE DRAWINGS

Illustrative embodiments will now be described with reference to the accompanying drawings in which:

FIG. 2 shows a schematic illustration of a communications system according to a first embodiment;

FIG. 3 shows the signals on the SPI bus during a polling sequence operating on the system shown in FIG. 2;

FIG. 8 shows an illustrative logic table for operations of the system shown in FIG. 7;

DETAILED DESCRIPTION

Figure 1:
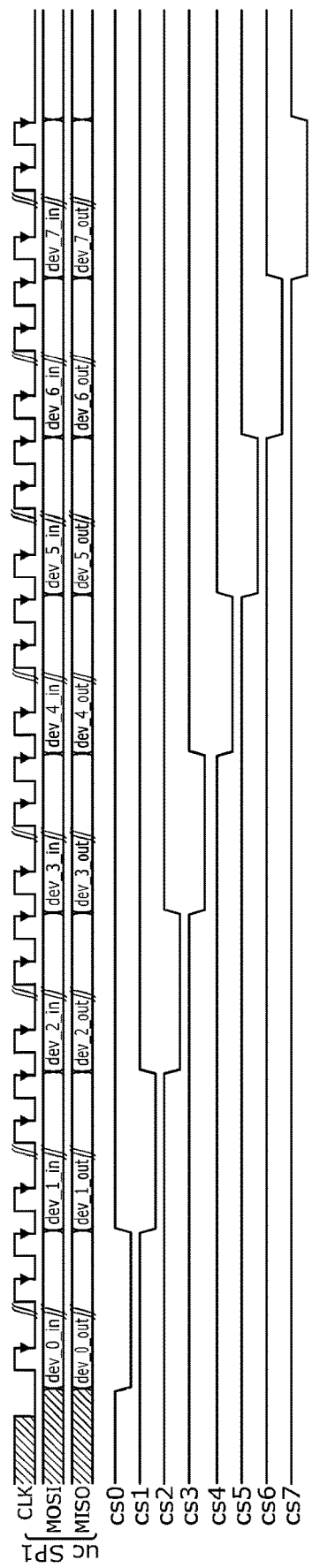
FIG. 1 shows the signals on an example prior art SPI bus.

FIG. 2 shows a communications system 1 according to a first embodiment. The communications system 1 includes a master circuit 3 communicatively coupled to four slave circuits 4a-4d.

The master circuit 3 includes a master SPI device 31 and a demultiplexer 32. The master SPI device is provided as an integrated circuit with the SPI address, clock (CLK), MOSI, and MISO terminals. The master SPI device 31 further includes a polling terminal for generating a polling signal independent of the address signals. The signals transmitted over the SPI bus are active-low signals.

The address terminal is connected to an input of the demultiplexer 32 via address signal line 52. The demultiplexer 32 includes a plurality of output CS terminals, CS_0 to CS_3, associated with each of the slave circuits 4a-4d. As such, a multiplexed address signal transmitted from the address terminal of the master SPI device 31 may be demultiplexed to generate an individual CS address signal in one of the output CS terminals of the demultiplexer 32.

Each of the four slave circuits 4a-4d includes a slave SPI device 41, together with an AND gate 42 connected to its CS input terminal and an output switch 43 connected to its output MISO terminal.

Each AND gate 42 is connected to both the output of the polling terminal on the master SPI device 31 via polling signal line 51 and the respective output CS terminal, CS_0 to CS_3, on the demultiplexer 32 via CS signal line 56a-d. In the absence of either a polling signal or an individual chip select signal, both the inputs to the AND gate 42 are high, causing the CS terminal on the respective slave SPI device 41 to be held high. When an active-low signal is applied to either input, the CS terminal on the respective slave SPI device 41 is set low, thereby activating it. Consequently, the slave SPI devices 41 of each slave circuit 4a-d may be activated by either the polling signal or an individual chip select signal applied via its respective CS signal line 56a-d.

Each output switch 43 is also controlled by the output of the respective output CS terminal on the demultiplexer 32 via CS signal lines 56a-d. As such, when an individual chip select signal is transmitted for activating a respective slave SPI device 41, the associated output switch 43 is switched to connect the respective output MISO terminal to the input MISO terminal on the master SPI device 31 via MISO data line 55.

MISO data line 55 connects the output switches of each of the slave circuits 4a-4d to the input MISO terminal on the master SPI device 31. Accordingly, data from any of the slave SPI devices 41 may be transmitted to the master SPI device 31, but only when its respective output switch 43 is activated.

The CLK and MOSI terminals of the master SPI device 31 are connected to the CLK and MOSI terminals of the slave SPI devices 41 via clock signal line 53 and MOSI data line 55 for transmitting clock and data signals.

FIG. 3 shows the signals on the SPI bus during an example polling sequence operating on the system shown in FIG. 2. The illustration shows 4 frames 61-64, with polling operations being actioned in frames 61 and 64. Frames 62 and 63 represent available bus time where polling operations are not being actioned and hence the SPI bus may be used for other operations.

In frame 61, the master SPI device 31 outputs a polling signal through its polling terminal as well as a CS address signal through its address terminal to cause the demultiplexer 32 to generate a chip select signal in chip select terminal CS_0 and hence CS signal line 56a. The master SPI device 31 also generates a clock signal through the CLK terminal and transmits an input diagnostic signal through the output MOSI terminal.

The polling signal on polling signal line 51 causes all four slave SPI devices 41 of the slave circuits 4a-d to be activated and to read data from the MOSI data line 54 via polling signal line 51. This thereby prompts the watchdog to reset for avoiding time out of the device. At the same time, only the output switch 43 of the first slave circuit 4a is activated because only the associated CS signal line 56a is carrying a CS signal. Consequently, only the first slave SPI device 41a can transmit diagnostic data to the master SPI device 31 on the MISO signal line 55.

In frame 64, a second refresh operation may be actioned. Again, the master SPI device 31 outputs a polling signal through its polling terminal, but in this instance the address signal from the main SPI device 31 causes the demultiplexer 32 to generate a chip select signal in the second chip select terminal CS_1, and hence CS signal line 56b. Accordingly, all four slave SPI devices 41 are again activated to read data from the MOSI data line 54, but only the output switch 43 of the second slave circuit 4b is activated. Consequently, for this frame, only the slave SPI device 41 of the second slave circuit 4b is able to transmit diagnostic data on the MISO signal line 55.

The above process may be repeated for further cycles to obtain diagnostic data from the third and fourth slave circuits 4c and 4d.

With the above arrangement, all the slave SPI devices 41 can thereby be refreshed in a single frame, albeit that the master SPI device 31 will only receive diagnostic data from one of the slave devices in each refresh cycle. Nevertheless, the diagnostic data is typically less important because the peripheral devices will normally be able to maintain their operation autonomously, and hence are tolerant to a reduction in their feedback rate, provided they can be refreshed regularly.

Importantly, with the arrangement shown in FIG. 2, conventional SPI data transfer processes may be implemented in frames in which polling operations are not occurring, such as in frames 62 and 63 shown in FIG. 3.

Figure 4:
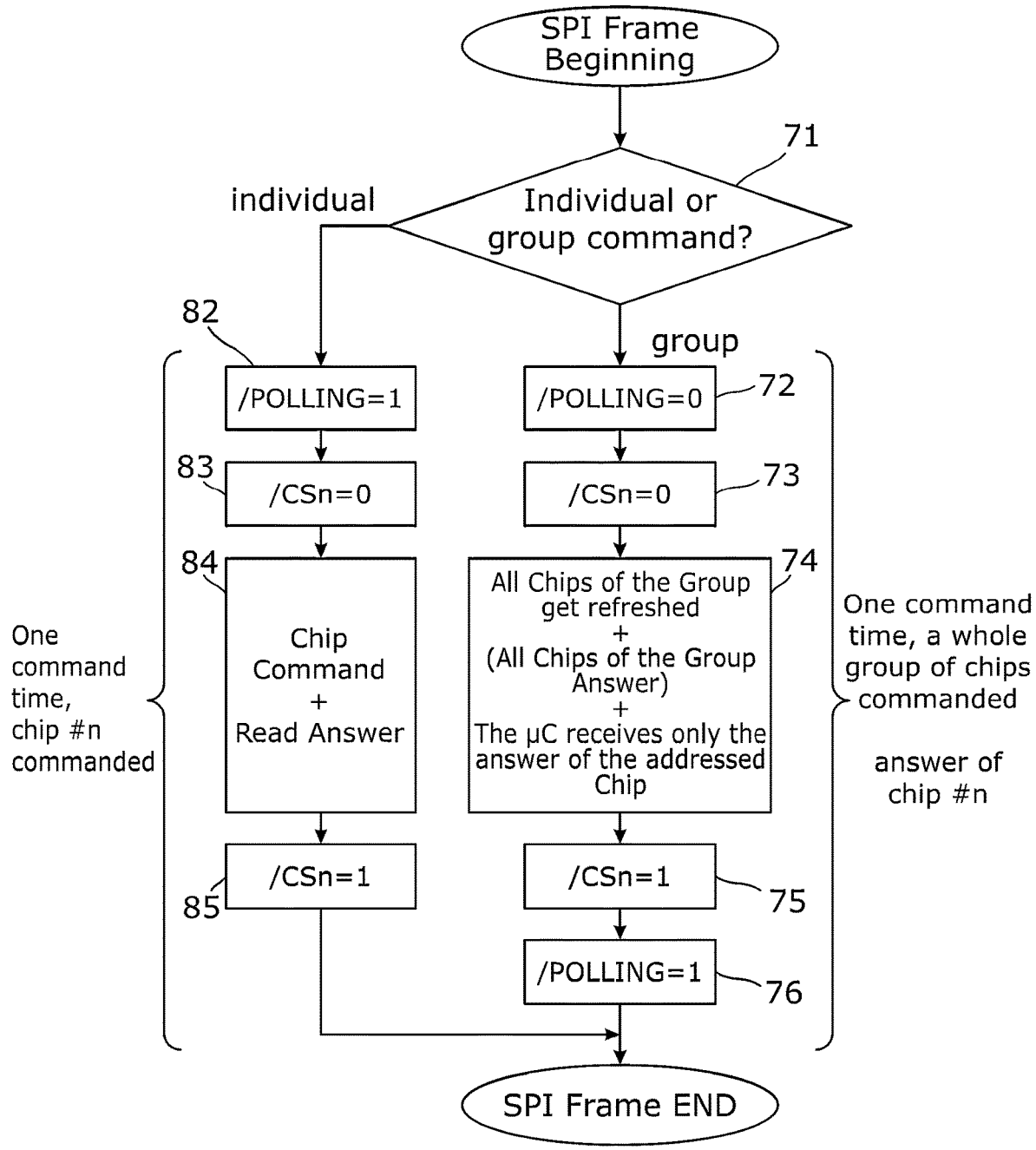
FIG. 4 shows a flow diagram of operations of the system shown in FIG. 2.

In this respect, FIG. 4 shows a flow diagram of operations of the system shown in FIG. 2. For each SPI frame, in step 71, it is decided whether to implement commands to individual slave circuits or whether to poll the whole group.

When a polling operation is selected to refresh the slave circuits 4a-d, this proceeds as discussed above with an active-low polling signal being applied to the polling signal line 51 in step 72, and an active-low CS signal being applied to one of the CS signal lines 56 in step 73. In step 74, this causes all the SPI slave device chips of the slave circuits 4a-d to be refreshed and generate an output signal. However, only the slave circuit 4a-d selected by the CS signal is transmitted back to the master circuit 3. The CS signal line 56 and the polling signal line 51 may then be set back to a logic low state in steps 75 and 76 to end the SPI frame.

When the system is commanding a specific slave circuit individually, for example for implementing a configuration operation, no polling signal is applied to the polling signal line 51 in step 82. An active-low CS signal is applied to one of the CS signal lines 56a-d in step 83. In step 84, this then causes the slave SPI device chip of the selected slave circuit 4a-d to read data from the MOSI signal line 54 and generate an output signal on the MISO signal line 55. As the associated output switch 43 is activated, the MOSI signal from the slave SPI device 41 is transmitted back to the master circuit 3. The CS signal line 56 may then be set back to a logic low state in step 85 to end the SPI frame. It will be understood that different slave circuits may be activated by generating CS signals in their respective CS signal lines.

Figure 5:
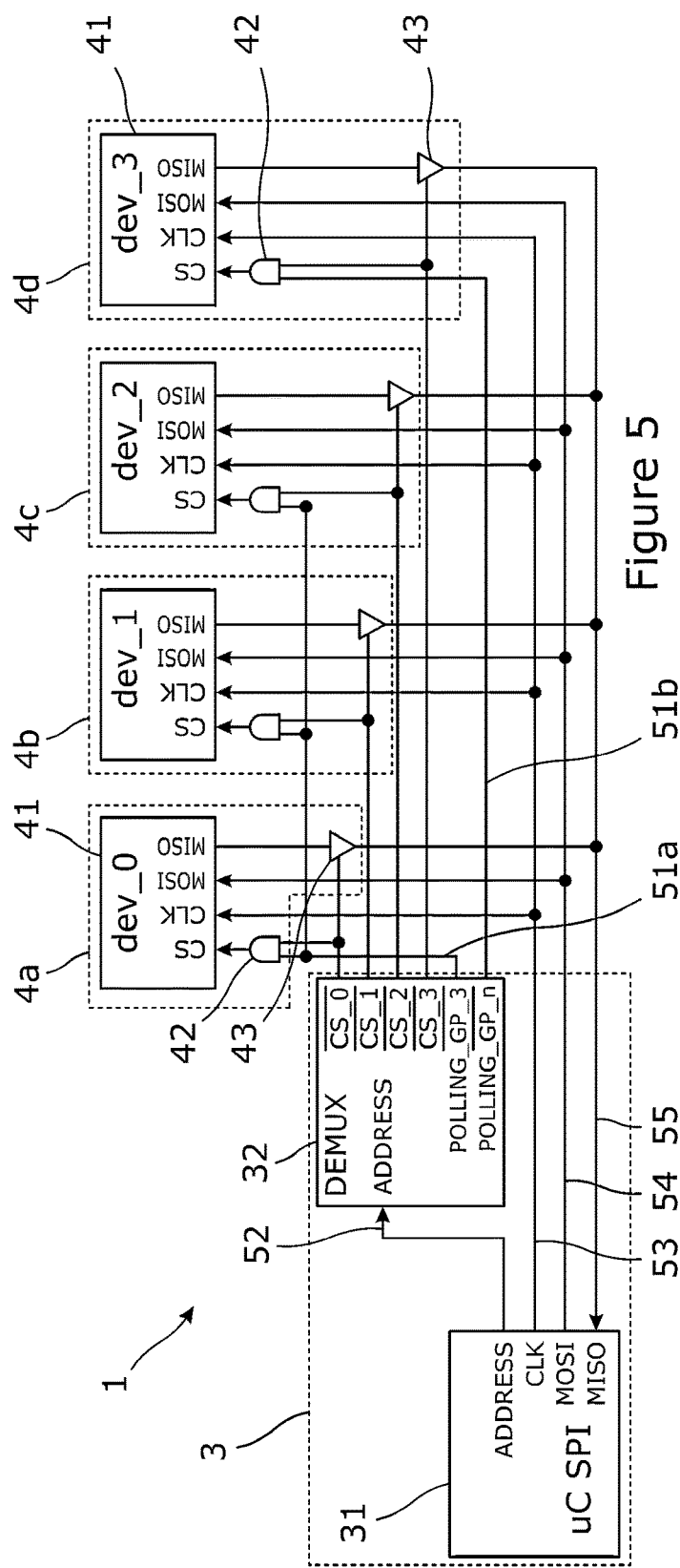
FIG. 5 shows a schematic illustration of a communications system according to a second embodiment.
Figure 6:
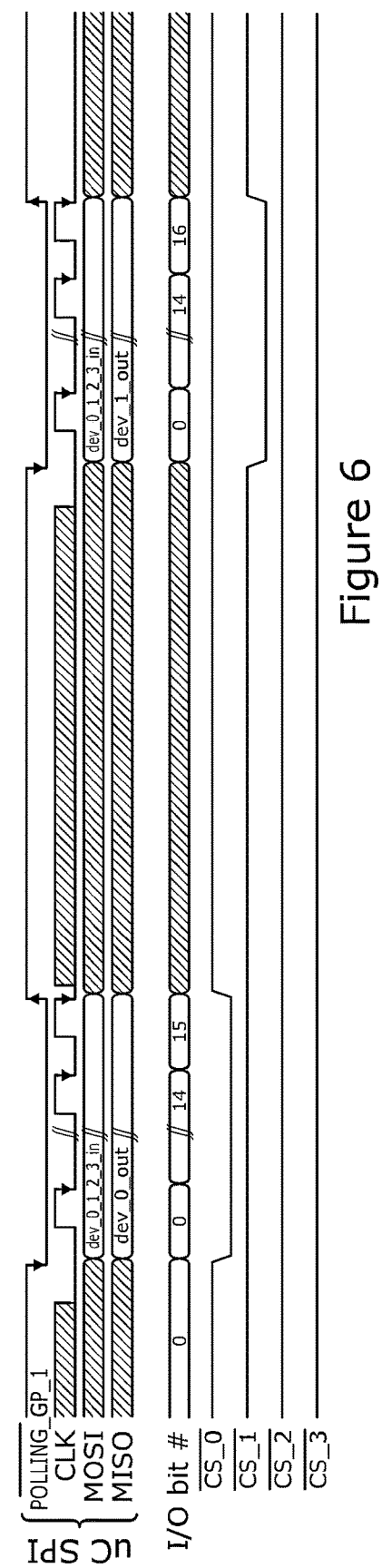
FIG. 6 shows the signals on the SPI bus during a polling sequence operating on the system shown in FIG. 5.

FIGS. 5 and 6 respectively show a schematic illustration and the SPI bus signals according to a second embodiment. This embodiment operates in substantially the same way as the first embodiment, with the same reference numerals being used for corresponding features. In this embodiment, however, rather than the polling signal terminal, POLLING_GP_1, being provided on the master SPI device 31, it is provided on the demultiplexer 32, along with a second polling signal terminal, POLLING_GP_n. The first and second polling signal terminals are independently activated based on demultiplexing the CS address signal transmitted on address signal line 52. The first polling signal terminal, POLLING_GP_1, is used for polling slave circuits 4a-c simultaneously as a first group of slave devices through first polling signal line 51a. The second polling signal terminal, POLLING_GP_n, is used for polling slave circuit 4d through second polling signal line 51b. It will be understood that in other embodiments further slave circuits may be included in the second polling groups or further polling groups may be provided by providing further polling signal terminals.

As shown in FIG. 6, the system shown in FIG. 5 may be operated in the same way as the first embodiment, with the generation of a polling signal being used to simultaneously refresh all slave circuits sharing a common polling signal line 56a-b, with only one of the slave circuits being selected each cycle to return data back to the master SPI device 31. As such, in this embodiment, a first group including three slave circuits 4a-c or a second group including only slave circuit 4d may be refreshed separately by addressing their respective polling signal terminals. This may thereby allow different slave SPI devices 41 to be refreshed at different rates.

In this embodiment, the address signal generated at the address terminal on the master SPI bus is multiplexed with the address signal's most significant bits being used to initiate a polling signal and designate which group of slave circuits is to be polled by activating the respective polling signal terminal. The address signal's least significant bits are used to designate which CS signal terminal is to be activated. It will be understood that other multiplexing protocols may alternatively be used.

Figure 7:
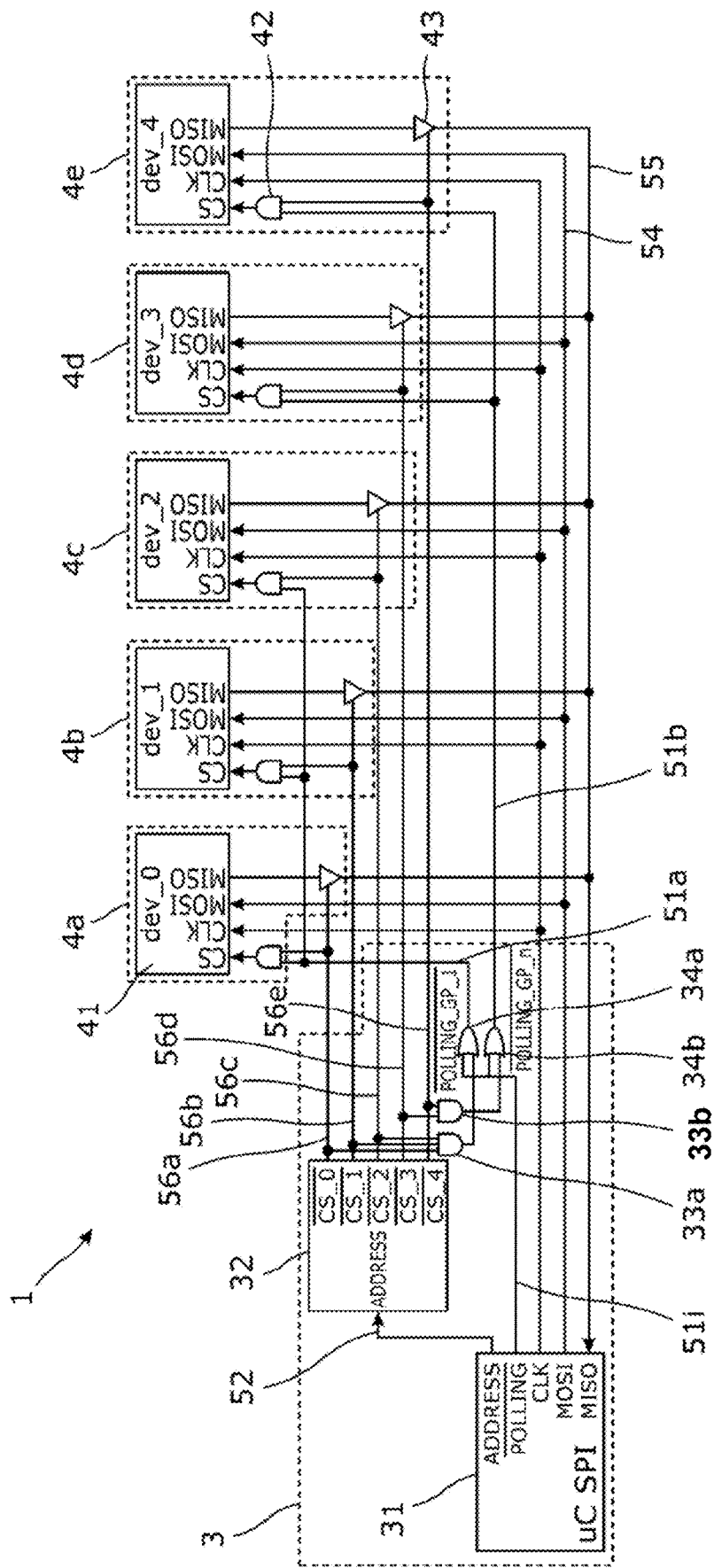
FIG. 7 shows a schematic illustration of a communications system according to a third embodiment.

FIG. 7 shows a schematic illustration of a system according to a third embodiment. This embodiment operates in substantially the same way as the second embodiment, with the same reference numerals being used for corresponding features. However, in this embodiment, five slave devices 4a-e are provided, and a single polling signal terminal on the master SPI device 31 is used to generate both the first and second polling signals via a combination of additional AND and OR gates.

In this connection, the master circuit 31 further includes first and second OR gates 34a, 34b for generating the first and second polling signals. Each OR gate 34a, 34b is connected to the polling signal terminal of the master SPI device 31 via polling input 51i, as well as all of the respective CS signal lines 56a-e corresponding to the slave circuits 4a-e in their group. To facilitate this for the first polling group including slave circuits 4a-c, a polling AND gate 33a is connected to each of CS signal lines 56a-c. As such, if an active-low signal is applied on any of CS signal lines 56a-c, an active low signal is output from the polling AND gate 33a and fed to the OR gate 34a. Similarly, the second polling group contains the fourth and fifth slave circuits 4d-e and therefore its polling AND gate 33b is connected to each of CS signal lines 56d-e. Again, if an active-low signal is applied on either of CS signal lines 56d-e, an active low signal is output from its polling AND gate 33b and fed to the respective OR gate 34b.

With the above arrangement, the first and second OR gates 34a, 34b maintain a high (logic low) signal when either the polling input 51i or their respective CS signal lines 56a-d are held high (logic low). However, if an active-low signal is applied by both the polling input 51i and one of CS signal lines 56a-c for the first polling group (first OR gate 34a) or one of CS signal line 56d-e for the second polling group (second OR gate 34b), an active-low polling signal is output by the respective OR gate 34a, 34b for activating all the slave SPI devices 41 in the respective group, as with the second embodiment. FIG. 8 shows a logic table summarising the operations of the system shown in FIG. 7. It will also be understood that other embodiments may include further slave circuits in either of the polling groups, as well as further polling groups.

Figure 9:
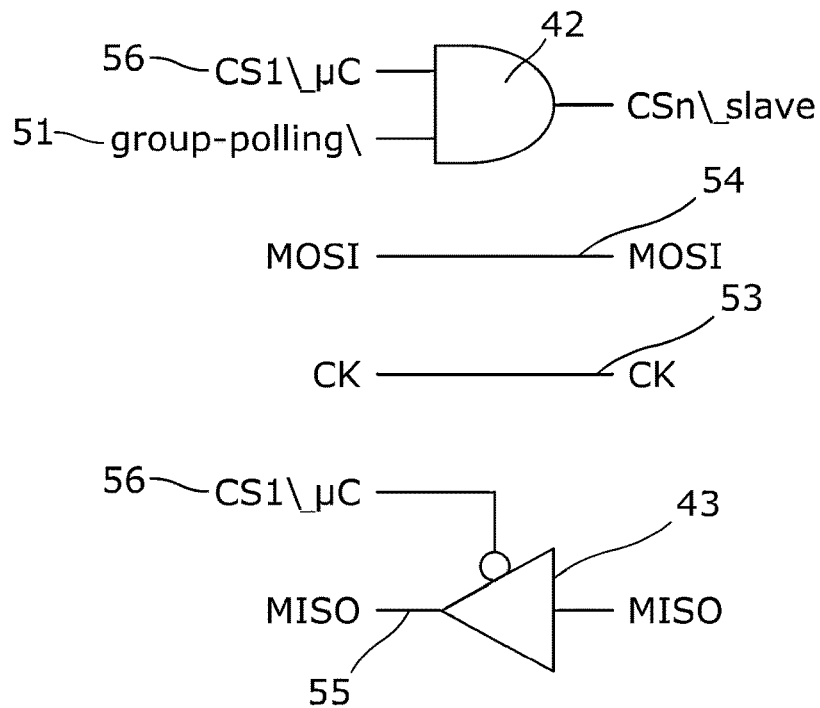
FIG. 9 shows the connections and integrated logic devices at each of the slave circuits.

FIG. 9 shows the connections and integrated logic devices at each of the slave circuits. The right-hand side shows the inputs to each slave SPI device 41. As shown, the AND gates 42 output to the CS terminal of the slave SPI device 41 and receive inputs from a respective CS signal line 56 as well as the polling signal line 51 for the respective group. In embodiments, the AND gates may be implemented using an open drain 74hc09 integrated circuit. The MOSI signal line 54 and the clock signal line 53 connect between the respective terminals on the master SPI device 31 and the slave SPI devices 41. The output switch 43 is provided in the MISO signal line 55 and is switched by the respective CS signal line 56. In embodiments, the output switch 43 may be implemented using a 74hc125 integrated circuit.

Figure 10:
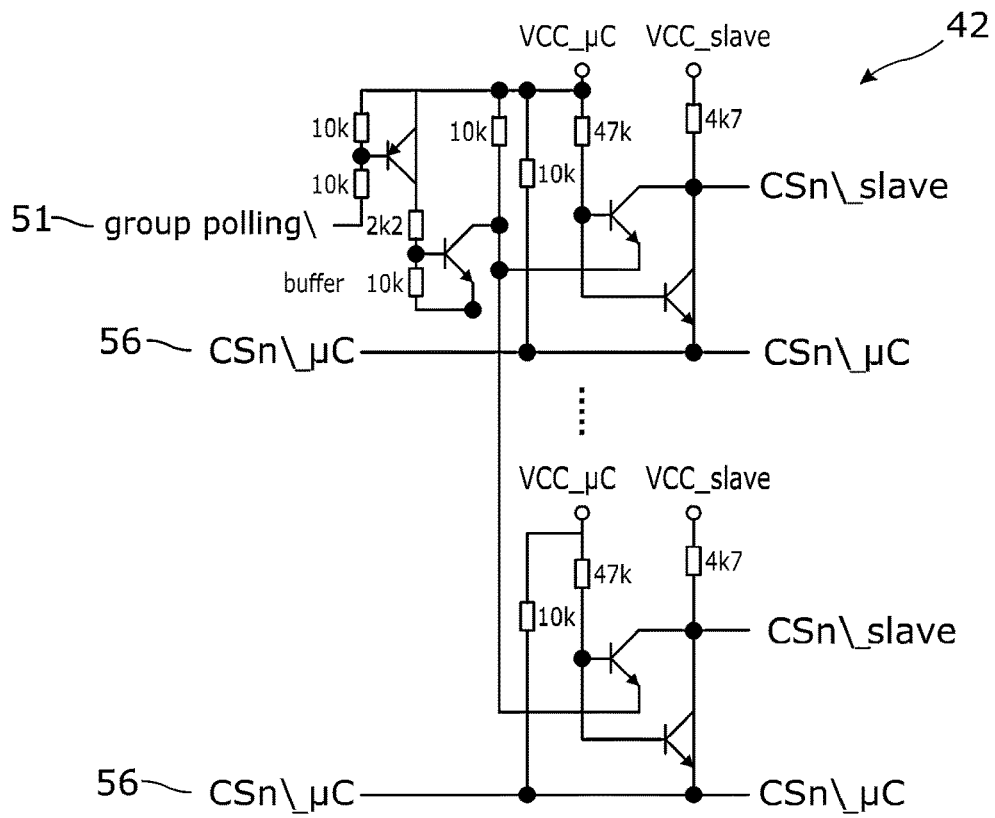
FIG. 10 shows an example discrete implementation alternative to the integrated AND gate shown in FIG. 10.

It will be understood that embodiments may use discrete implementations for the AND gates 42 and output switches 43, rather than utilising integrated circuits. For example, FIG. 10 shows an illustrative discrete implementation of two AND gates 42 for controlling the activation of two slave SPI devices 41.

It will be understood that the above arrangements allow for the fast polling of multiple slave SPI devices within a single SPI frame, thereby allowing their watchdog timers to be reset to prevent inadvertent time outs. As such, the use of SPI frames for refresh cycles is minimised, freeing time on the SPI bus for other operations. At the same time, the arrangement may allow for the use of standard SPI integrated circuits since it does not require modification of the SPI clock signal or significant additional CS control signals, or the use of non-standard software. This thereby minimises costs as off the shelf components may be used.

It will be understood that the embodiments illustrated above shows applications only for the purposes of illustration. In practice, embodiments may be applied to many different configurations, the detailed embodiments being straightforward for those skilled in the art to implement.

In this connection, for example, it will be understood that whilst in the above embodiments the CS signal terminals are provided on the demultiplexer, in other embodiments, no demultiplexer is required. For example, the CS signal terminals may be incorporated into the master SPI device.

Furthermore, the above illustrative examples describe arrangements which allow all the slave devices in a group to be activated in the same SPI command frame for the purpose of refreshing their watchdogs. However, it will be understood that the arrangement may also be used for commands. That is, the whole group of slave devices can be turned on and instructed in the same command frame, thereby allowing those devices to simultaneously receive commands from the master device. This may be implemented using the group command steps 72-76 shown in FIG. 4.

What is claimed is:

1. A communications system comprising:
a master circuit comprising a master serial peripheral interface (SPI) device having an input master-in slave-out (MISO) terminal; and
a plurality of slave circuits coupled for communication with the master circuit, each slave circuit comprising a slave SPI device, an activation terminal for activating the slave SPI device, and an output switch for connecting a MISO terminal of the slave SPI device to the input MISO terminal when activated,
wherein the master circuit further comprises:
a polling signal terminal for transmitting a polling signal to the activation terminals of at least a first group of the plurality of slave circuits for activating their respective slave SPI devices; and
a plurality of output chip-select (CS) terminals, each independently activatable for transmitting a CS signal to both the activation terminal and the output switch of a respective one of the plurality of slave circuits for activating the respective slave SPI device and connecting its output MISO terminal for transmitting data to the input MISO terminal.

2. The communications system of claim 1, wherein:
the master circuit further comprises a demultiplexer connected to an address terminal provided on the master SPI device; and
the plurality of output CS terminals are provided on the demultiplexer and are individually activatable in response to the demultiplexing of an address signal from the address terminal.

3. The communications system of claim 1, the communications system further comprising a second polling signal terminal for transmitting a second polling signal to the activation terminals of a second group of the plurality of slave circuits for simultaneously activating their respective slave SPI devices.

4. The communications system of claim 3, wherein the master circuit further comprises a polling logic arrangement, the polling signal terminal and the second polling signal terminal being provided on the polling logic arrangement, wherein the polling logic arrangement:
comprises a plurality of logic gates connected to the master polling terminal provided on the master SPI device and the output CS terminals associated with the first and second groups of slave circuits; and
is configured to transmit a polling signal from one of the first or second polling signal terminals in response to both a master polling signal and at least one CS signal associated with a slave circuit in the respective group.

5. The communications system of claim 1, wherein the polling signal terminal is further provided on a demultiplexer and is activated based on demultiplexing an address signal from an address terminal.

6. The communications system of claim 1, wherein the master SPI device comprises a clock terminal for transmitting a clock signal to each slave SPI device.

7. The communications system of claim 1, wherein the master SPI device comprises an output master-out slave-in (MOSI) terminal for transmitting data from the master SPI device to each slave SPI device.

8. The communications system of claim 7, further comprising a MOSI line connected between the output MOSI terminal and input MOSI terminals provided on the plurality of slave circuits.

9. The communications system of claim 1, further comprising:
a MISO line connected between the input MISO terminal and the output MISO terminals of the plurality of slave circuits;
a polling signal line connected between the polling signal terminal and the activation terminals of the plurality of slave circuits; and
a plurality of CS signal lines, each connected between one of the plurality of output CS terminals and the activation terminal and output switch of one of the slave circuits.

10. A method for operating a communications system, the method comprising:
providing a master circuit that comprises a polling signal terminal, a plurality of output chip-select (CS) terminals, and a master serial peripheral interface (SPI) device having an input master-in slave-out (MISO) terminal;
providing a plurality of slave circuits coupled for communication with the master circuit, each slave circuit comprising a slave SPI device, an activation terminal, and an output switch;
transmitting a polling signal from the polling signal terminal to the activation terminals of at least a first group of the plurality of slave circuits for activating their respective slave SPI devices, wherein a respective output MISO terminal is prevented from transmitting data to the input MISO terminal by the output switch unless it is activated; and
transmitting CS signals from individual ones of the CS terminals to a respective one of the plurality of slave circuits for activating its activation terminal to activate the respective slave SPI device and for activating the output switch to connect its output MISO terminal to the input MISO terminal for transmitting data thereto.

11. The method of claim 10, wherein the method further comprises transmitting a sequence of SPI frames, wherein each SPI frame comprises transmitting a polling signal and a CS signal from one of the CS terminals to a respective slave circuit, wherein the CS signal is transmitted from a different CS terminal in each frame of the sequence of SPI frames for sequentially connecting the respective output MISO terminals of the slave circuits to the input MISO terminal.

12. The method of claim 10, wherein:
the step of providing the master circuit further comprises providing a demultiplexer connected to an address terminal provided on the master SPI device, the plurality of output CS terminals being provided on the demultiplexer; and
the method further comprises the steps of:
transmitting an address signal from the address terminal to the demultiplexer;
demultiplexing the address signal at the demultiplexer; and
generating a CS signal from one of the CS terminals for transmission to a respective one of the plurality of slave circuits based on the demultiplexed address signal.

13. The method of claim 12, wherein the step of demultiplexing the address signal comprises selecting one of the CS terminals to transmit the CS signal based on one of least significant bits or most significant bits associated with the address signal.

14. The method according of claim 12, wherein:

the step of providing a demultiplexer further comprises providing the polling signal terminal on the demultiplexer; and the method further comprises generating the polling signal from the polling signal terminal based on the demultiplexed address signal.

15. The method of claim 14, wherein the step of demultiplexing the address signal comprises selecting to generate a polling signal from the polling signal terminal or a second polling signal from a second polling signal terminal based on one of least significant bits or most significant bits associated with the address signal.

16. The method of claim 10, wherein the method further comprises transmitting a second polling signal from a second polling signal terminal to the activation terminals of a second group of the plurality of slave circuits for simultaneously activating their respective slave SPI devices.

17. The method of claim 16, wherein:

the step of providing the master circuit further comprises a polling logic arrangement, the polling signal terminal and the second polling signal terminal being provided on the polling logic arrangement, the polling logic arrangement comprising a plurality of logic gates connected to the master polling terminal provided on the master SPI device and the output CS terminals associated with the first and second groups of slave circuits; and the method further comprises transmitting a polling signal from one of the first or second polling signal terminals in response to both a master polling signal and at least one CS signal associated with a slave circuit in the respective group.

18. The method of claim 10, wherein the polling signal terminal is further provided on a demultiplexer and is activated based on demultiplexing an address signal from an address terminal.

19. The method of claim 10, wherein the master SPI device comprises a clock terminal for transmitting a clock signal to each slave SPI device.

20. The method of claim 10, wherein the master SPI device comprises an output master-out slave-in (MOSI) terminal for transmitting data from the master SPI device to each slave SPI device.

* * * * *